June 10, 1947.　　　J. MIHALYI　　　2,422,032
FILM CONTAINER REEL
Filed Oct. 25, 1944　　　2 Sheets-Sheet 1
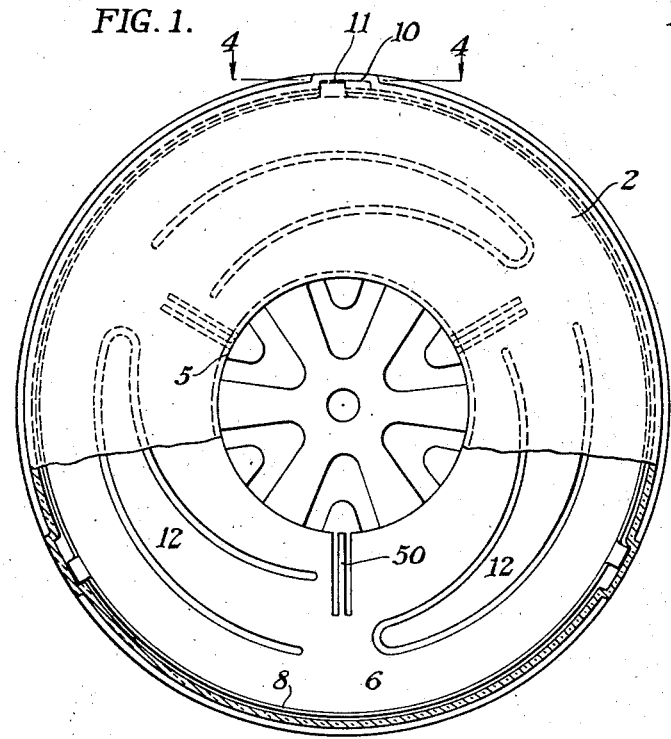
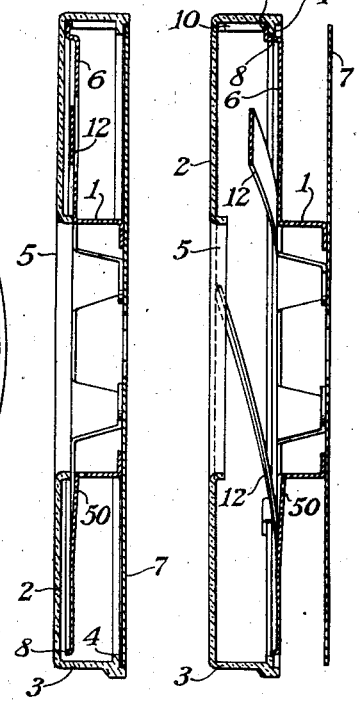
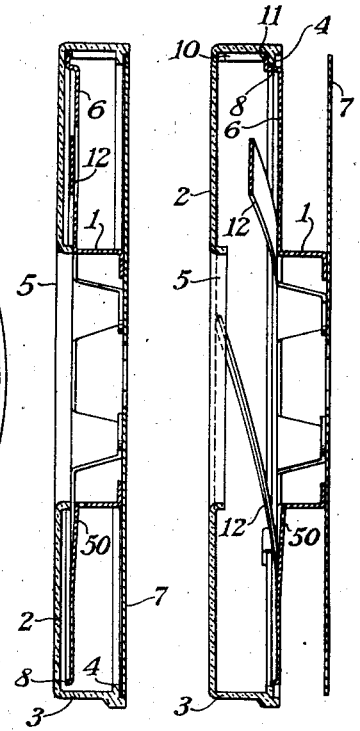
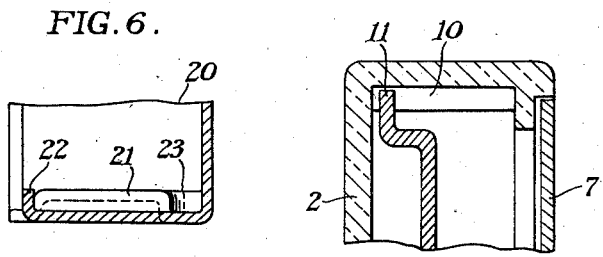
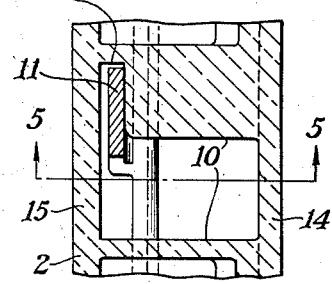
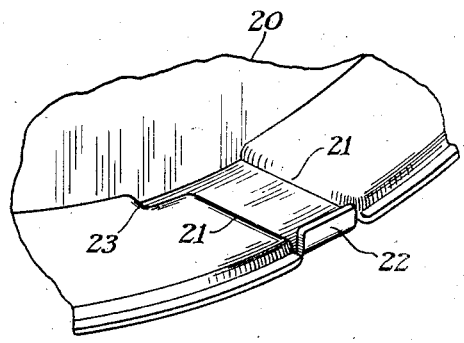
JOSEPH MIHALYI
INVENTOR
BY
ATTORNEYS June 10, 1947.  J. MIHALYI  2,422,032

FILM CONTAINER REEL

Filed Oct. 25, 1944  2 Sheets-Sheet 2

JOSEPH MIHALYI
INVENTOR

BY
ATTORNEYS

Patented June 10, 1947

2,422,032

UNITED STATES PATENT OFFICE 2,422,032

FILM CONTAINER REEL

Joseph Mihalyi, Rochester, N. Y., assignor to Eastman Kodak Company, Rochester, N. Y., a corporation of New Jersey Application October 25, 1944, Serial No. 560,274

6 Claims. (Cl. 206—52)

This invention relates to reels particularly designed for motion picture film. One object of my invention is to provide a reel with a container which is movable into two positions; into one position for protecting the convolutions of film wound on the reel and into a second position for exposing a film, permitting it to be wound freely between the flanges of the reel. Another object of my invention is to provide a simple type of reel and container which can be quickly opened and closed by merely turning one part relatively to the other. Another object is to provide a reel and container which may be used on a projector like an ordinary reel. Other objects will appear from the following specification, the novel features being particularly pointed out in the claims at the end thereof.

In the past motion picture reels normally consisted of two flanges fastened on to a hub. The flanges of such film reels are usually perforated or usually contain cutout portions so that film wound on such reels is not protected against dust and dirt. There are various types of containers on the market which usually consist of "pillbox" types of box sections in which the reels can be placed to protect film. They have numerous disadvantages since they consist of two parts and the reel must be removed from and replaced in the containers for projection. Not only are the parts apt to scratch furniture when handled in the dark or semidarkness, but if labeled with titles, film is often placed in the wrong container after use.

My present invention is directed to overcoming these difficulties by providing a two-part unitary reel and container, the parts of which are always fastened together in such a manner that one part may slide relatively to the other part to expose or protect a film band. The two parts consist generally of a modified form of reel and a cover which are so mounted that the cover may slide axially with respect to the reel into its operative and inoperative positions.

Coming now to the drawings wherein like reference character denote like parts throughout.

Fig. 1 is a front plan view partially broken away and partially shown in section, showing a preferred embodiment of my invention;

Fig. 2 is a transverse section taken through the film reel and container shown in Fig. 1, the parts being shown in their operative or film protecting position;

Fig. 3 is a view similar to Fig. 2 but with the parts shown in an inoperative position or a position in which film convolutions may be freely wound between the flanges of the film reel;

Fig. 4 is an enlarged fragmentary detail section taken on line 4—4 of Fig. 1;

Fig. 5 is an enlarged fragmentary section taken on line 5—5 of Fig. 4;

Fig. 6 is a fragmentary enlarged sectional view through a portion of the guiding track and bayonet lock used in a second embodiment of my invention;

Fig. 7 is a fragmentary perspective view of a guiding rail and bayonet lock used in connection with a second embodiment of my invention;

Figure 8:
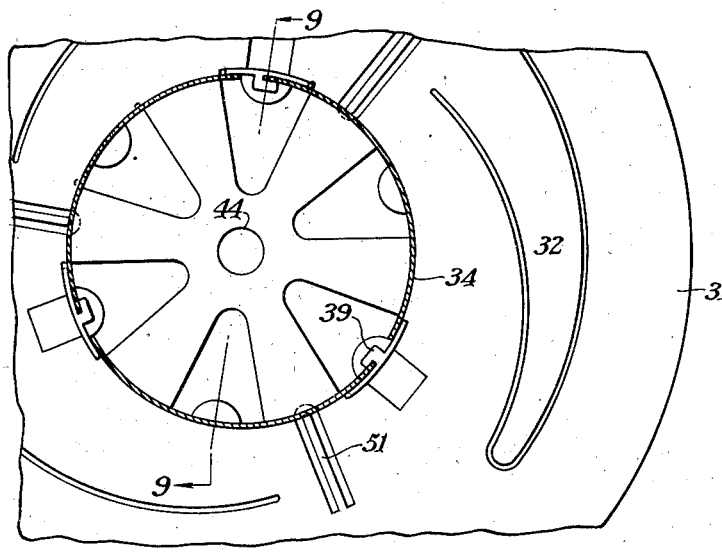
Fig. 8 is a fragmentary transverse section through a reel container constructed in accordance with a third embodiment of my invention.

In the embodiments of my invention shown in the drawings, I have provided a two-part reel container, one part consisting of a reel and the other part consisting of a cover. The two parts are slidably mounted one on the other so that the cover member can be moved axially of the reel to and from a position in which winding is permitted.

More specifically referring to Figures 1 to 3 inclusive, a preferred form of my invention may consist of a reel designated broadly as 1 and a cover designated broadly as 2. In the present instance the cover 2 may be made of molded plastic material and may consist of a cup shaped member having a cylindrical flange 3 provided with an inwardly extending rim 4. There may be a central opening 5 as shown in these figures. The reel 1 may include spaced flanges 6 and 7, flange 6 being modified by being provided with an offset rim 8 which extends upwardly to engage the rim 4 of the cover 2 as shown in Fig. 3. The cover 2 is mounted on the reel 1 to slide axially thereof by means of a series of rails 10 here shown as 3 in number, these rails being spaced apart in pairs to engage slide members 11 which are carried by the periphery of the reel flange 6. Thus, the cover member 2 may slide from the position in Fig. 2 in which it protects film on the reel 1 to the position shown in Fig. 3 in which the flanges 6 and 7 of the spool 1 are exposed so that convolutions of film may be wound thereon.

The cover member 2 is normally held in its inoperative or Fig. 3 position by means of a series of springs 12 located between the flange 6 and the cover member 2. These springs may conveniently be formed out of the metal of the flange 6 as shown.

In order to hold the cover 2 in its operative or Fig. 2 position, I have provided bayonet latches as shown in Figures 4 and 7. The rails 10 as shown in Fig. 4 normally guide the sliding member 11 so that the cover and reel may move axially with respect to each other. Since there are solid walls 14 and 15 at the ends of the rail 10, the movement of the cover 2 relative to the reel 1 is limited. When the slide member 11 reaches the wall 15, a slight turning movement of the cover 2 relative to the reel 1 will cause the slide member 11 to enter the notch 16 formed in the plastic material. Thus the notch 16 at the end of the rail members and the slide members 11 form a bayonet latch which will hold the cover 2 in a closed position against the pressure of the spring fingers 12.

In Figures 6 and 7 I have shown a portion of a cover member 20 which in this form is made of metal rather than plastic material as described above. In these figures there are guiding rails 21 for guiding suitable slide members such as the reel slide members 11 and a stop 22 is formed up at the outer edge of the rails 21. This limits the movement of the cover relative to the reel. There is also a transverse notch 23 at one end of rails 21 which will serve as a bayonet latch element in a similar manner to the notch 16 described above.

If desired, the means of mounting the cover 2 on the reel 1 may be placed about the hub of the reel rather than at the periphery thereof as described above. This third embodiment of my invention is disclosed in Figures 8 to 10 inclusive. In these figures the hub is shown at 30 and a spool flange 31 is attached to the hub and includes spring fingers 32. In this instance a cover member 33 is provided with an inner cylindrical flange 34 which is slightly smaller than the diameter of the hub 30 and a plurality of arms 35 extend inwardly from this flange. These arms are provided with a slot 36 leaving guiding rails 37 on both sides of the slot and at the inner end thereof there is an offset slot 38 which serves as one element of a bayonet latch. The slots 36 are engaged by slidable members 39 which are carried by the film spool 30 so that the cover member 33 may slide axially of the spool designated broadly as 41 which includes the flange 34, a second flange 42, and a hub member 43.

The flange 42 is preferably made of a solid sheet of metal except for the opening 44 to receive a spindle mount for the reel. The flange 34 may also have an opening for the spindle mount, but since this flange is not to protect the film against dust and dirt it may be perforated and may carry the spring fingers 32.

Figure 9:
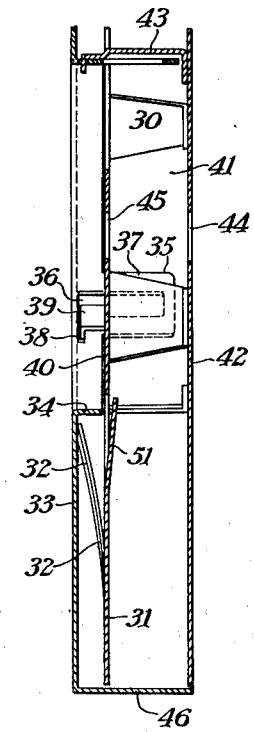
Fig. 9 is a section taken on line 9—9 of Fig. 8.
Figure 11:
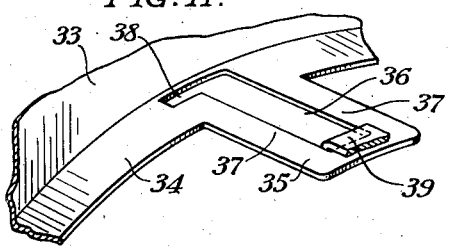
Fig. 11 is a perspective detail showing a position of the slidable mount and bayonet lock used with the reel container of Fig. 8.
Figure 12:
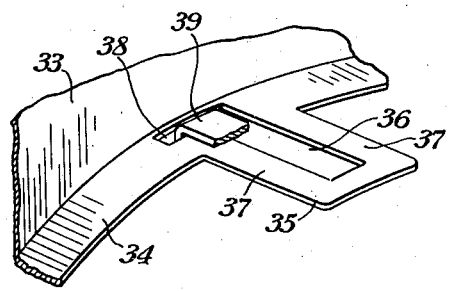
Fig. 12 is a view similar to Fig. 11 but with the bayonet lock in a latched position.

With the parts as above described, the operation is much the same as with the first described embodiments of my invention. The cover 33 is provided with an annular flange 46 of such a width that it may cover the distance between the flanges 34 and 42 when in a closed or operative position as shown in Fig. 9. When in this position, the slots 38 and the slides 39 constitute bayonet latches and may lie in the position shown in Fig. 12.

Figure 10:
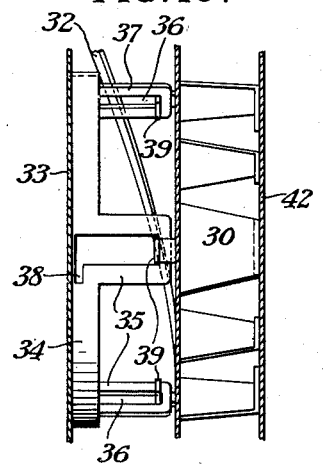
Fig. 10 is a section similar to Fig. 9 but with the parts in their open or film winding position.

If the reel container should be placed on a projector, in order to move the cover to its inoperative position, it should be turned relative to the reel releasing the slides 39 from the notches 38 and permitting the cover to move outwardly as the slides 39 pass between the rails 37. This position is shown in Fig. 10. Film may then pass freely between the flanges 40 and 42.

I prefer to provide the film reels with a means of attaching the end of a film to the reel consisting of spring fingers. In Fig. 1 these spring fingers are shown at 50 and in Fig. 8 the spring fingers are shown at 51. In both instances the spring fingers lie closer together than the width of the film and consequently will catch the end of a film laid between them. The spring fingers themselves form no part of my present invention since they are similar to the spring fingers shown in Patent 1,861,882, Ross, June 7, 1932.

It will be noticed that with both embodiments of my invention there is a unitary structure which serves both as a film reel and a container, and since these parts slide one on the other, they always remain together whether they are moved to an inoperative position in which film may be freely wound between the reel flanges or whether they may be moved to an operative position in which the cover will, with one flange of the film reel, form a substantially dust-tight container for the film. It is obvious that various changes in the invention may suggest themselves to those skilled in the art, and while I have illustrated several preferred forms of my invention in the drawings, it will be obvious that other forms may be made which will come within the scope of the appended claims.

I claim:

1. A unitary reel and container consisting of two parts, a reel and a cover, the reel comprising a hub and flanges attached thereto to receive film therebetween, the cover comprising a plate including a flange about its periphery to telescope the reel to close the opening between the flanges and means for slidably mounting one part on the other part whereby the cover may slide to uncover the space between the reel flanges enabling film to be wound therebetween, and springs between the cover and a reel flange for normally holding one part from the other.

2. A unitary reel and container consisting of two parts, a reel and a cover, the reel comprising a hub and flanges attached thereto to receive film therebetween, the cover comprising a plate including a flange about its periphery to telescope the reel to close the opening between the flanges and means for slidably mounting one part on the other part whereby the cover may slide to uncover the space between the reel flanges enabling film to be wound therebetween, and springs carried by one reel flange for normally holding the cover in an inoperative position exposing the reel flanges for winding film.

3. A two part film reel and container, one part comprising a film reel having a hub with spaced flanges thereon, the other part comprising a shallow cup shaped cover, means for guiding the cup shaped cover to and from the film reel comprising tracks on one part parallel to the reel axis and slides engaging the tracks on the other part, means for retaining the slides in engagement with the tracks, and springs between the cover and one flange normally holding the cover in an inoperative position exposing the film reel for winding film.

4. A two part film reel and container, one part comprising a film reel having a hub with spaced flanges thereon, the other part comprising a shallow cup shaped cover, means for guiding the cup shaped cover to and from the film reel comprising tracks on one part parallel to the reel axis and slides engaging the tracks on the other part, means for retaining the slides in engagement with the tracks, and springs between the cover and one flange normally holding the cover in an inoperative position exposing the film reel for winding film, and a bayonet latch including the tracks and slides for holding the cover in an operative film protecting position engaging both reel flanges.

5. A unitary two part reel and container, one part comprising a reel having a hub and flanges at least one of which protects the entire area of a film wound thereagainst, the second part comprising a cover including a solid wall parallel to a reel flange and an annular rim of a depth to cover the space between the flanges, and means for movably supporting the second part by the first part, said means being positioned axially of the reel, and spring fingers carried by a reel flange and pressing against the cover tending to separate the first and second parts.

6. A unitary reel and container structure comprising two slidably connected parts, a reel and a cover member, tracks and members to slide on the tracks, the tracks being carried by one part and the members to slide on the tracks being carried by the other part, means for limiting the movement of one part relative to the other at one end of the tracks, said members slidable on the tracks constituting one bayonet latch element, offsets on the ends of the tracks constituting a second bayonet latch element whereby said relatively movable parts may be locked together at one end of the tracks.

JOSEPH MIHALYI.

REFERENCES CITED

The following references are of record in the file of this patent:

UNITED STATES PATENTS

| Number | Name | Date |
| --- | --- | --- |
| 1,371,786 | Hummell, et al. | Mar. 15, 1921 |
| 1,747,931 | Debrie | Feb. 18, 1930 |